US011384278B2

(12) United States Patent
Miralles et al.

(10) Patent No.: US 11,384,278 B2
(45) Date of Patent: Jul. 12, 2022

(54) AQUEOUS FORMULATIONS OF SURFACTANTS AND ASSOCIATIVE POLYMERS FOR THE ASSISTED RECOVERY OF PETROLEUM

(71) Applicant: RHODIA OPERATIONS, Aubervilliers (FR)

(72) Inventors: Vincent Miralles, Bordeaux (FR); Mikel Morvan, Pessac (FR); David-James Wilson, Coye la Foret (FR)

(73) Assignee: RHODIA OPERATIONS, Aubervilliers (FR)

( * ) Notice: Subject to any disclaimer, the term of this patent is extended or adjusted under 35 U.S.C. 154(b) by 11 days.

(21) Appl. No.: 16/771,029

(22) PCT Filed: Dec. 13, 2018

(86) PCT No.: PCT/EP2018/084704
§ 371 (c)(1),
(2) Date: Jun. 9, 2020

(87) PCT Pub. No.: WO2019/121298
PCT Pub. Date: Jun. 27, 2019

(65) Prior Publication Data
US 2021/0171821 A1 Jun. 10, 2021

(30) Foreign Application Priority Data
Dec. 19, 2017 (FR) ...................................... 1762401

(51) Int. Cl.
*E21B 43/16* (2006.01)
*C09K 8/588* (2006.01)
*C09K 8/584* (2006.01)

(52) U.S. Cl.
CPC .............. *C09K 8/588* (2013.01); *C09K 8/584* (2013.01); *E21B 43/16* (2013.01)

(58) Field of Classification Search
CPC .......... C09K 8/588; C09K 8/584; E21B 43/16
See application file for complete search history.

(56) References Cited

U.S. PATENT DOCUMENTS

| 9,518,211 | B2 * | 12/2016 | Kimura | C09K 8/265 |
| 10,053,616 | B2 * | 8/2018 | Chang | E21B 43/16 |
| 10,457,862 | B2 * | 10/2019 | Cadix | C08F 220/56 |
| 10,808,064 | B2 * | 10/2020 | Wilson | C09K 8/68 |
| 2014/0110305 | A1 * | 4/2014 | Barnes | C09K 8/584 |
| | | | | 208/14 |
| 2014/0378617 | A1 * | 12/2014 | Wilson | C08F 293/005 |
| | | | | 525/291 |
| 2016/0068743 | A1 * | 3/2016 | Cadix | E21B 43/16 |
| | | | | 166/305.1 |

FOREIGN PATENT DOCUMENTS

| FR | 2967686 A1 | 5/2012 |
| WO | 03054350 A1 | 7/2003 |
| WO | 03056130 A1 | 7/2003 |
| WO | 2014167056 A1 | 10/2014 |
| WO | 2014167059 A1 | 10/2014 |

OTHER PUBLICATIONS

Machine Translation of WO2014167059A1.
Machine Translation of WO2014167056A1.
Machine Translation of FR2967686A1.
Machine Translation of WO03054350A1.

* cited by examiner

*Primary Examiner* — Silvana C Runyan
(74) *Attorney, Agent, or Firm* — Osha Bergman Watanabe & Burton LLP

(57) ABSTRACT

An aqueous formulation for enhanced oil recovery may include at least one surfactant and at least one associative polymer. The associative polymer may be obtained by micellar radical polymerization by bringing into contact, in an aqueous medium, hydrophilic monomer dissolved in the aqueous medium, hydrophobic monomers in the form of a micellar solution, at least one radical polymerization initiator, and preferably at least one radical polymerization control agent.

16 Claims, No Drawings

AQUEOUS FORMULATIONS OF SURFACTANTS AND ASSOCIATIVE POLYMERS FOR THE ASSISTED RECOVERY OF PETROLEUM

This application is a U.S. national phase entry under 35 U.S.C. § 371 of International Application No. PCT/EP2018/084704, filed on Dec. 13, 2018, which claims priority to French Application No. 1762401, filed on Dec. 19, 2017. The entire contents of these applications are explicitly incorporated herein by this reference.

The present invention relates to the field of surfactants and polymers used for the enhanced recovery of crude oil from underground formations, and in particular to the problems of compatibility of these entities when they are employed in conjunction in steps of enhanced oil recovery.

During the extraction of oil from a hydrocarbon reservoir (oil-yielding reservoir such as a consolidated or non-consolidated rock formation, or a sand, for example), according to a first step known as "primary recovery", the oil is entrained out of a production well by the excess pressure naturally prevailing in the reservoir. This primary recovery makes it possible to access only a small amount of the oil contained in the reservoir, typically of the order of 10% to 15% at the very most.

In order to make it possible to continue the extraction of the oil after this primary recovery, secondary production methods are employed, when the pressure in the reservoir becomes insufficient to displace the oil still in place. Typically, a fluid is injected (reinjection of the produced water, diluted or undiluted, injection of sea or river water, or else injection of gas, for example) within the hydrocarbon reservoir for the purpose of exerting, in the reservoir, an excess pressure capable of entraining the oil toward the production well(s). A common technique in this context is the injection of water (also denoted by the term "waterflooding"), in which large volumes of water are injected under pressure into the reservoir via injection wells. The water injected entrains a part of the oil which it encounters and pushes it toward one or more production wells. The secondary production methods, such as the injection of water, make it possible, however, to extract only a relatively small part of the hydrocarbons in place (typically of the order of 30%). This partial sweeping is due in particular to the trapping of the oil by capillary forces, to the differences in viscosity and in density existing between the injected fluid and the hydrocarbons in place, and also to heterogeneities at micro- or macroscopic scales (scale of the pores and also scale of the reservoir).

In an attempt to recover the rest of the oil, which remains in the underground formations after implementation of primary and secondary production methods, various techniques have been proposed, referred to as "enhanced oil recovery", abbreviated to EOR (or enhanced (or improved) hydrocarbon recovery, EHR)).

Mention may in particular be made, among the EOR techniques, of techniques similar to the abovementioned injection of water (flooding), but employing an extraction fluid based on water comprising additives, such as, for example, water-soluble surfactants (then typically referred to as "surfactant flooding") or else thickening (viscosifying) polymers, typically polyacrylamide derivatives (then referred to as "polymer flooding").

The use of surface-active agents according to "surfactant flooding" brings about in particular a decrease in the water/oil interfacial tension, which is typically suitable for increasing the capillary number by several orders of magnitude and thus for ensuring a more effective entrainment of the oil trapped in the pore constrictions.

The thickening (viscosifying) polymers used in "polymer flooding" for their part bring about a modification in the viscosity of the injected fluid, which makes it possible to improve the efficiency of the sweeping by the extraction fluid (the oil is mobilized more homogeneously and more efficiently in view of the modification in viscosity of the injected fluid).

According to a specific alternative form, it has been proposed, according to the technique known as "surfactant polymer flooding", to combine the effects of the abovementioned surfactants and polymers, by using mixtures comprising both surfactants and thickening (viscosifying) polymers.

A problem encountered with the abovementioned mixtures of surfactant/polymer type is the compatibility between the surfactants and the polymers, and this very particularly is the case when use is made of formulations which result in the formation of vesicles, of the type of those described, for example, in the Journal de Physique II, France, volume 3 (1993), pages 1255-1270. In the majority of cases, with surfactant/polymer formulations of this type, a decrease in compatibility of the mixture of surfactants and polymers is observed, which, unless the medium is diluted considerably, is typically accompanied by the appearance of a turbidity, indeed even of macroscopic phase separation phenomena, which reduces the properties provided by the surfactant and the polymer.

This problem is even more marked in the presence of salts, which is a difficulty in the context of oil extraction operations, where the presence of salts in a not insignificant amount is more than common, indeed even systematic: this is because the injection fluids employed in EOR very often use, as solvent medium, sea water or production water, which are brines having a high, indeed even very high, content of salts.

Furthermore, the abovementioned problem of compatibility between surfactants may be further exacerbated when the temperature increases. This is another source of difficulties in the field of oil extraction, where the extraction fluids are very often used at fairly high temperatures (following their injection under pressure into underground formations, the fluids are typically brought to temperatures of greater than or equal to 70° C., indeed even of greater than or equal to 100° C.).

One aim of the present invention is to provide new types of surfactant/polymer mixtures suitable for EOR, for which the abovementioned problem of compatibility between surfactants and polymers is inhibited as much as possible.

To this end, the present invention provides surfactant/polymer mixtures comprising specific associative polymers, namely polymers as obtained on conclusion of a micellar radical polymerization, the inventors of which have now demonstrated that they exhibit an improved compatibility with the surfactants employed in the context of EOR, and very particularly with the surfactants of the type forming vesicles.

More specifically, a subject matter of the present invention is an aqueous formulation suitable as extraction fluid in enhanced oil recovery, which comprises:
 (i) at least one surfactant, and generally a mixture of surfactants; and
 (ii) at least one polymer as obtained according to a step (E) of micellar radical polymerization in which the following are brought into contact, within an aqueous medium (M):

hydrophilic monomers, dissolved or dispersed in said aqueous medium (M);

hydrophobic monomers in the form of a micellar solution, said micellar solution containing, in the dispersed state within the medium (M), micelles comprising these hydrophobic monomers; and at least one radical polymerization initiator, this initiator typically being water-soluble or water-dispersible;

preferably at least one radical polymerization control agent.

The polymers used in the context of the present invention have the specific characteristics of the polymers obtained according to the micellar radical polymerization technique.

The term "micellar radical polymerization" is understood to mean, within the meaning of the present description, a polymerization which also will be denoted by "micellar polymerization" for the purposes of brevity in the continuation of the description, in which block polymers of multiblock type are synthesized by copolymerization of hydrophilic monomers and of hydrophobic monomers within an aqueous dispersing medium (typically water or a water/alcohol mixture) which comprises:

the hydrophilic monomers in the dissolved or dispersed state in said medium; and the hydrophobic monomers present within micelles.

The micelles employed in micellar polymerization are formed in the aqueous medium by a surface-active agent which forms these micelles, which is introduced into said medium at a concentration greater than its critical micelle concentration (cmc).

According to a specific mode, the hydrophobic monomers present within micelles employed in micellar polymerization may be monomers which in themselves have the property of forming micelles, without having, in order to do this, the need to add additional surface-active agents (these monomers are said to be "self-micellizable" in the continuation of the description). According to this specific mode, the surface-active agent employed to form the micelles may be the self-micellizable hydrophobic monomer itself employed without other surface-active agent, but the presence of an additional surface-active agent is not, however, excluded when self-micellizable monomers are employed.

Thus, within the meaning of the present description, when mention is made of "hydrophobic monomers within micelles", this notion encompasses in particular:

mode 1: hydrophobic monomers present within micelles formed by surface-active agents, where said surface-active agents are distinct from the hydrophobic monomers; and/or mode 2: self-micellizable monomers forming by themselves micelles in an aqueous medium, with micelles which may then be formed in all or in part by said self-micellizable monomers.

The abovementioned modes 1 and 2 are compatible and may coexist (hydrophobic monomers which are not self-micellizable within micelles formed by another self-micellizable monomer, for example; or alternatively micelles comprising a combination of surface-active agents and of self-micellizable monomers).

In micellar polymerization, whatever the exact nature of the micelles, the hydrophobic monomers contained in the micelles are said to be in "micellar solution". The micellar solution to which reference is made is a microheterogeneous system which is generally isotropic, optically transparent and thermodynamically stable.

It should be noted that a micellar solution of the type of that employed in micellar polymerization is to be distinguished from a microemulsion. In particular, unlike a microemulsion, a micellar solution is formed at any concentration exceeding the critical micelle concentration of the surfactant employed, with the sole condition that the hydrophobic monomer be soluble at least to a certain extent within the internal space of the micelles. A micellar solution furthermore differs from an emulsion by the absence of a homogeneous internal phase: the micelles contain a very small number of molecules (typically less than 1000, generally less than 500 and typically from 1 to 100, with most often 1 to 50 monomers and at most a few hundred molecules of additional surface-active agent, if appropriate). Furthermore, generally, a micellar solution is transparent with regard to visible light, in view of the small size of the micelles, which does not result in phenomena of refraction, unlike the drops of an emulsion, which refract light and confer on it its characteristic cloudy or white appearance.

The micellar polymerization technique results in characteristic block polymers which each contain several hydrophobic blocks of substantially the same size and where this size may be controlled. This is because, in view of the confinement of the hydrophobic monomers within the micelles, each of the hydrophobic blocks formed is of controlled size and contains substantially a defined number $n_H$ of hydrophobic monomers, it being possible for this number $n_H$ to be calculated as follows (*Macromolecular Chem. Physics*, 202, 8, 1384-1397, 2001):

$$n_H = N_{agg}[M_H]/([\text{surfactant}]-\text{cmc})$$

in which formula:

$N_{agg}$ is the aggregation number of the surfactant, which reflects the surfactant number present in each micelle;

$[M_H]$ is the molar concentration of hydrophobic monomer in the medium;

[surfactant] is the molar concentration of surfactant in the medium; and cmc denotes the critical micelle (molar) concentration.

The micellar polymerization technique thus makes possible an advantageous control of the hydrophobic units introduced into the polymers formed, namely:

an overall control of the molar fraction of hydrophobic units in the polymer (by adjusting the ratio of the concentrations of the two monomers); and a more specific control of the number of hydrophobic units present in each of the hydrophobic blocks (by modifying the parameters influencing the $n_H$ defined above).

The polymers obtained in micellar polymerization are amphiphilic block polymers which have a specific controlled structure, namely, schematically, based on a backbone formed of hydrophilic (water-soluble or water-dispersible) units interrupted at various places by small hydrophobic blocks, these hydrophobic blocks all being of substantially identical size.

According to a preferred embodiment, the polymers employed according to the invention are polymers as obtained according to a micellar radical polymerization step (E) which is specifically a radical polymerization of controlled type, namely carried out in the presence of an agent for control of the radical polymerization. The term "radical polymerization control agent" (or more simply "control agent") is understood to mean, within the meaning of the present description, a compound capable of lengthening the lifetime of the growing polymer chains in a polymerization reaction and, preferably, of conferring, on the polymerization, a living or controlled nature.

When a radical polymerization control agent of the abovementioned type is employed, in addition to the advantages related to the implementation of the micellar polymerization, it proves to be possible to control the average molecular weight of the polymers as obtained on conclusion of step (E): this weight may be controlled by the amount of control agent used (for a given amount of hydrophilic monomers, the weight generally decreases as this amount increases).

According to one possible embodiment, it is possible to use in step (E) a control agent which is a radical polymerization control agent of irreversible type, typically chosen from mercaptans, such as mercaptopropionic acid, thioglycolic acid or mercaptoethanol, primary or secondary alcohols, such as ethanol or isopropanol, or alternatively formic acid and its salts.

Alternatively, according to a particularly advantageous embodiment, the control agent employed in step (E) is a reversible transfer agent as employed in controlled radical polymerizations denoted under the terminology RAFT or MADIX, which typically employ a reversible addition-fragmentation transfer method, such as those described, for example, in WO 96/30421, WO 98/01478, WO 99/35178, WO 98/58974, WO 00/75207, WO 01/42312, WO 99/35177, WO 99/31144, FR 2 794 464 or WO 02/26836.

When a reversible-type radical polymerization control agent is employed, the polymers as obtained on conclusion of step (E) exhibit, in addition to the advantages related to the implementation of the micellar polymerization (namely, the control of the molar fraction of hydrophobic units in the polymers; and (ii) a control of the number of hydrophobic units in each hydrophobic block):
   a control of the average molecular weight (which may be finely controlled by the amount of control agent used: for a given amount of hydrophilic monomers, the weight decreases as this amount increases); and
   a control of the distribution of the hydrophobic blocks within the various chains;
   the production of polymer chains having a living nature, offering the possibility of preparing complex polymers having controlled architecture.

These advantages are very particularly pronounced when the radical polymerization control agent employed is a compound which is soluble or dispersible in the aqueous medium (M) employed in step (E), and/or when this control agent is not suitable for penetrating into the micelles of the micellar solution. This effect may also be observed in the case where the control agent is not soluble/dispersible in the medium (M) or when the control agent is suitable for penetrating into the micelles.

According to an advantageous embodiment, the radical polymerization control agent employed in step (E) is a compound which comprises a thiocarbonylthio —S(C=S)— group. Thus, for example, it may be a compound which comprises a xanthate group (carrying —SC=S—O— functional groups), for example a xanthate. Other types of control agent which are employed in controlled radical polymerization may be envisaged (for example of the type of those employed in CMP, in ATRP or in NMP).

According to a particular embodiment, the control agent used in step (E) may be a polymer chain derived from a controlled radical polymerization and bearing a group that is capable of controlling a radical polymerization (polymer chain of "living" type, which is a type that is well known per se). Thus, for example, the control agent may be a polymer chain (preferably hydrophilic or water-dispersible) functionalized at the chain end by a xanthate group or more generally comprising an —SC=S— group, for example obtained according to the RAFT/MADIX technology.

Alternatively, the control agent employed in step (E) is a non-polymer compound carrying a group which ensures control of the radical polymerization, in particular a thiocarbonylthio —S(C=S)— group.

The studies which have been carried out by the inventors in the context of the present invention have now made it possible to demonstrate that the polymers as obtained according to the abovementioned micellar radical polymerization step (E) exhibit an increased compatibility with the surfactants, and in particular those used in EOR, this very particularly being the case when the polymers result from a step (E) employing a control agent of the abovementioned type. In particular, unlike the other viscosifying polymers used in the state of the art, the polymers as obtained according to step (E) form more effective mixtures with the surfactants employed in the "surfactant polymer flooding" techniques, with a much lower tendency for the appearance of turbidity or phase separation, this in particular being the case in formulations where the constituents have a nature and concentrations suitable for the formation of vesicles.

In particular, the polymers of use according to the invention prove to be very particularly advantageous with surfactants comprising or consisting of one or more surfactants chosen from:
   anionic surfactants of sulfonate type,
   and in particular:
      internal olefin sulfonates, preferably C15 to C28, for example C20-24, internal olefins sulfonates
      alkylarylsulfonates and in particular alkylbenzenesulfonates, (ABS) where the alkyl group preferably comprises at least 15 carbon atoms, for example between 15 and 24 carbon atoms, such as, for example, an alkylarylsulfonate with a C15-18 alkyl
      sulfonates and/or disulfonates of α-sulfocarbonyl compounds as described in particular in WO 2016/177817, such as, for example,
      sulfosuccinates and sulfosuccinamates
   anionic surfactants of the type of alkyl ether sulfates (also called AES, or alkoxylated alkyl sulfates), where the alkyl group preferably comprises at least 10 carbon atoms, for example between 10 and 16 carbon atoms, preferentially propoxylated and/or ethoxylated alkyl ether sulfates containing up to 40 ethoxy groups and/or up to 20 propoxy groups, for example comprising from 0 to 10 ethoxy groups and 0 to 10 propoxy groups (with at least one ethoxy or propoxy group present), such as, for example, an alkyl ether sulfate with a C12-13 alkyl group comprising 7 propoxy groups
   anionic surfactants of the type of alkyl glyceryl ether sulfonates (AGES), where the alkyl group preferably comprises at least 10 carbon atoms, for example between 10 and 16 carbon atoms, these AGES being preferentially propoxylated and/or ethoxylated, and containing, for example, between 0 and 20 ethoxy groups and between 0 and 10 propoxy groups (with at least one ethoxy or propoxy group present)
   anionic surfactants of the type of alkyl ether carboxylates
   the mixtures of these anionic surfactants.

Alternatively, the polymers of use according to the invention may be employed with surfactants comprising or consisting of one or more surfactants chosen from styryl phenol alkoxylate sulfates, styryl phenol alkoxylate phosphates and the mixtures of these surfactants with one or more of the surfactants mentioned in the preceding section.

According to an advantageous embodiment, use is made, according to the invention, of a mixture of surfactants comprising:
- at least one first anionic surfactant of sulfonate type, preferably of the abovementioned type; and
- at least one second anionic surfactant chosen from alkyl ether sulfates (AES), alkyl glyceryl ether sulfonates (AGES), alkyl ether carboxylates, and their mixtures, this second surfactant preferably being chosen from the abovementioned preferential surfactants.

For example, it is possible to employ, according to the invention, a mixture of surfactants of sulfonate type, in particular of the abovementioned type (for example an alkylbenzenesulfonate), with at least one anionic surfactant of alkoxylated alkyl sulfate type, in particular of the abovementioned type, for example a mixture comprising from 15% to 85% (in particular from 20% to 80%) of sulfonates and from 85% to 15% (respectively from 80% to 20%) of alkoxylated alkyl sulfates, by weight, with respect to the total weight of the sulfonate and alkoxylated alkyl sulfate surfactants.

Thus, typically, a mixture comprising from 40% to 60% by weight of at least one C15-18 alkylbenzenesulfonate (alkylbenzenesulfonate where the alkyl group comprises from 15 to 18 carbon atoms) and from 60% to 40% by weight of a C12-13 7PO alkyl sulfate (alkyl sulfate with a C12-13 alkyl group comprising 7 propoxy groups) proves to be advantageous.

According to another embodiment, use is made, according to the invention, of a mixture of surfactants comprising surfactants of sulfonate type, preferably of the abovementioned type (for example an alkylbenzenesulfonate), with at least one anionic surfactant of AGES type, for example a mixture comprising from 15% to 85% (in particular from 20% to 80%) of sulfonates and from 85% to 15% (respectively from 80% to 20%) of AGES, by weight, with respect to the total weight of the sulfonate and AGES surfactants.

According to yet another possible embodiment, use is made of a mixture of surfactants comprising from 40% to 60% by weight of an internal olefin sulfonate and from 60% to 40% by weight of alkyl ether sulfate.

Alternatively, use may be made of a mixture of surfactants comprising from 40% to 60% by weight of alkylbenzenesulfonate and from 60% to 40% by weight of alkyl glyceryl ether sulfonate.

According to yet another possible embodiment, use is made of a mixture of 40% to 60% by weight of an internal olefin sulfonate and of 60% to 40% by weight of alkyl glyceryl ether sulfonate.

According to yet another possible embodiment, use is made of a mixture of 40% to 60% by weight of a sulfonates and disulfonates of α-sulfocarbonyl compounds and of 60% to 40% by weight of alkyl glyceryl ether sulfonate.

According to yet another possible embodiment, use is made of a mixture of 40% to 60% by weight of a sulfonates and disulfonates of α-sulfocarbonyl compounds and of 60% to 40% by weight of alkyl ether sulfate.

The abovementioned anionic surfactants may optionally be employed with:
- surfactants of amphoteric type, preferentially of betaine or sultaine type, more preferentially of betaine or sultaine type with alkyl chains comprising more than 12 carbon atoms; and/or
- nonionic surfactants, preferentially of the type of ethoxylated alcohols, for example of the type of ethoxylated alcohols with alkyl chain lengths comprising more than 12 carbon atoms;
- alkylpolyglucosides (APG).

Furthermore, the surfactants employed in an aqueous formulation according to the present invention preferably comprise surfactants having a nonlabile nature, namely surfactants which are not lyzed under the conditions of use of said formulation.

In the context of the present invention, in addition to the various abovementioned advantages, the inventors have also demonstrated that, unexpectedly, the polymers of use according to the invention result, in a mixture with surfactants of the abovementioned type, in a particularly marked increase in the viscosity, greater than that observed when employing non-associative polymers.

Moreover, also surprisingly, it turns out that the aqueous formulations of the invention result in a decrease in the retention of surfactants within the porous medium, which makes them candidates of choice for the extraction of oil present in underground formations during enhanced oil recovery steps.

The use of the formulations of the invention for the extraction of oil constitutes, according to a specific aspect, another subject matter of the present invention.

According to yet another aspect, a subject matter of the present invention is a process for enhanced oil recovery from an underground formation, in which:
- an aqueous formulation according to the invention, namely comprising a surfactant, typically of the abovementioned type, and a polymer as obtained according to the abovementioned step (E), is injected into said underground formation, by at least one injection well; and
- a fluid conveying the oil leaving the underground formation is recovered via at least one production well.

Various possible aspects and embodiments of the invention will now be described in greater detail.

The Hydrophilic Monomers

Typically, the hydrophilic monomers which participate in the composition of the polymers used according to the present invention may comprise monomers chosen from:
- carboxylic acids which are ethylenically unsaturated, sulfonic acids and phosphonic acids, and/or their derivatives, such as acrylic acid (AA), methacrylic acid, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid (AMPS), vinylphosphonic acid, α-methylvinylphosphonic acid and allylphosphonic acid and their salts (acrylic acid and 2-acrylamido-2-methylpropanesulfonic acid prove to be particularly advantageous);
- esters of α,β-ethylenically unsaturated mono- and dicarboxylic acids with C2-C3 alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol (meth)acrylates or (meth)acrylamides;
- amides of α,β-ethylenically unsaturated monocarboxylic acids and their N-alkyl and N,N-dialkyl derivatives, such as acrylamide, methacrylamide, N-methyl(meth)acrylamide, N,N-dimethyl(meth)acrylamide, morpholinyl(meth)acrylamide, and metholylacrylamide (acrylamide and N,N-dimethylacrylamide prove to be particularly advantageous);

N-vinyllactams, such as N-vinylpyrrolidone or N-vinylpiperidone;

sulfobetaines; and the mixtures and combinations of two or more of the abovementioned monomers.

According to a specific embodiment, these monomers may in particular comprise acrylic acid (AA). According to one possible embodiment, the monomers are all acrylic acids but it is also possible to envisage the use, as monomers, of a mixture comprising inter alia acrylic acid as a mixture with other hydrophilic monomers.

According to a preferential embodiment, the hydrophilic monomers of step (E) comprise (meth)acrylic acid and/or (meth)acrylamido monomers.

Within the meaning of the present description, the term "(meth)acrylic acid" encompasses methacrylic acid, acrylic acid and their mixtures.

In the same way, within the meaning of the present description, the term "(meth)acrylate" encompasses the methacrylate, the acrylate and their mixtures.

In the same way, within the meaning of the present description, the term "(meth)acrylamide/(meth)acrylamido" encompasses methacrylamide/methacrylamido, acrylamide/acrylamido and their mixtures. The monomers containing acid groups may be used for the polymerization in the form of the free acid or in the partially or completely neutralized form. KOH, NaOH, aqueous ammonia or another base may be used, for example, for the neutralization.

According to another specific embodiment, the monomers employed in the process of the invention are acrylic acid, methacrylic acid and/or their salts and/or their mixtures.

According to a highly suitable embodiment, the monomers employed in step (E) comprise (and typically consist of) (meth)acrylamide monomers, or more generally (meth)acrylamido monomers, including, for example:

the following acrylamido monomers:
acrylamide (AM),
AMPS,
sulfopropyldimethylammoniopropylacrylamide;

the following methacrylamido monomers: sulfopropyldimethylammoniopropylmethacrylamide (SPP) or sulfohydroxypropyldimethylammoniopropylmethacrylamide.

The abovementioned acrylamide (AM) and AMPS are in particular highly suitable as constituent hydrophilic monomers of the associative polymers employed in the context of the present invention. According to one embodiment, the polymer employed according to the invention comprises at least one of these hydrophilic monomers or a mixture of these monomers.

According to a specific embodiment, the monomers of step (E) are acrylamides. An acrylamide employed in step (E) is preferably an acrylamide not stabilized with copper. In the event of copper being present, it is preferable to introduce a copper-complexing agent, such as EDTA, if appropriate, preferably in an amount of 20 to 2000 ppm. When acrylamides are used in step (E), they may typically be employed in the form of a powder or of an aqueous solution (optionally, but not necessarily, stabilized with hydroquinone monomethyl ether HQME or else with copper salts (preferably with the addition of EDTA, if appropriate)).

Whatever their exact nature, the hydrophilic monomers of step (E) may be employed at relatively high concentrations, typically at concentrations which would be sufficient to ensure the formation of gel if step (E) were carried out in the absence of a control agent. The inventors have now demonstrated that, surprisingly, the polymerization of step (E) may, if necessary, be carried out under conditions which correspond to those of the gel polymerization, including in the presence of a control agent, this being the case without necessarily resulting in gelling of the reaction medium during the polymerization when it is carried out in the presence of a control agent.

Typically, the initial monomer concentration in the reaction medium of step (E) may range up to 40% by weight, indeed even up to 50% by weight, this concentration generally remaining less than 30% by weight, with respect to the total weight of the reaction medium. For example, the initial monomer concentration in the reaction medium of step (E) is between 0.5% and 35% and in particular between 1% and 30% by weight, with respect to the total weight of the reaction medium.

According to a specific embodiment, the hydrophilic monomers employed in step (E) are heat-sensitive macromonomers which are insoluble in water beyond a certain temperature (cloud point) but are soluble at lower temperature, step (E) being carried out (at least in part) at a temperature below the temperature of the cloud point. The macromonomers of this type typically exhibit a polymerizable functional group of (meth)acrylamido or (meth)acrylate type, and a side chain composed of ethylene oxide or propylene oxide sequences (random or in blocks), or else based on N-isopropylacrylamide or on N-vinylcaprolactam. This embodiment in particular gives access to the preparation of polymers exhibiting heat-thickening properties, which may be used, for example, in the petroleum industry.

Preferably, in step (E), all the hydrophilic monomers are dissolved and/or dispersed within the aqueous medium (M).

The Hydrophobic Monomers

These monomers, employed in step (E) in the form of a micellar solution, namely a solution containing, in the state dispersed within the medium (M), micelles comprising these hydrophobic monomers. Provided that they can be incorporated into micelles of this type, any monomer of hydrophobic nature may be envisioned in step (E).

Mention may in particular be made, as nonlimiting examples of hydrophobic monomer which may be used according to the invention, of:

vinylaromatic monomers, such as styrene, α-methylstyrene, para-chloromethylstyrene, vinyltoluene, 2-methylstyrene, 4-methylstyrene, 2-(n-butyl)styrene, tert-butylstyrene or 4-(n-decyl)styrene;

halogenated vinyl compounds, such as vinyl or vinylidene halides, for example vinyl or vinylidene chlorides or fluorides, corresponding to the formula

where: $X^1$=F or Cl
$X^2$=H, F or Cl
each one of $R_b$ and $R_c$ represents, independently:
H, Cl, F; or
an alkyl group, preferably chlorinated and/or fluorinated, more advantageously perchlorinated or perfluorinated;

esters of α,β-ethylenically unsaturated mono- or dicarboxylic acid with C4-C30 alkanols, for example n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachinyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linolyl (meth)acrylate, linolenyl (meth)acrylate, stearyl (meth)acrylate, lauryl (meth)acrylate and their mixtures;

esters of vinyl or allyl alcohol with C1-C30 monocarboxylic acids, for example vinyl acetate, vinyl propionate, vinyl butyrate, vinyl laurate, vinyl stearate, vinyl propionate, vinyl versatate and their mixtures;

esters of α,β-ethylenically unsaturated mono- and dicarboxylic acids with C4-C30 alkanediols, for example 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate and 3-hydroxy-2-ethylhexyl methacrylate;

primary amides of α,β-ethylenically unsaturated mono- and dicarboxylic acids and N-alkyl and N,N-dialkyl derivatives, such as N-(n-butyl)(meth)acrylamide, N-(tert-butyl)(meth)acrylamide, N-(n-octyl)(meth)acrylamide, N-(1,1,3,3-tetramethylbutyl) (meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-arachinyl(meth)acrylamide, N-behenyl (meth)acrylamide, N-lignoceryl(meth)acrylamide, N-cerotinyl(meth)acrylamide, N-melissinyl(meth)acrylamide, N-palmitoleoyl(meth)acrylamide, N-oleyl(meth)acrylamide, N-linolyl(meth)acrylamide, N-linolenyl(meth)acrylamide, N-stearyl(meth)acrylamide and N-lauryl(meth)acrylamide; or dihexylacrylamide;

C2-C8 monoolefins and nonaromatic hydrocarbons comprising at least one double bond, for example ethylene, propylene, isobutylene, isoprene or butadiene.

According to a preferential embodiment, the hydrophobic monomers employed according to the invention may be chosen from:

C4-C30 alkyl and preferably C6-C22 alkyl α,β-unsaturated esters, in particular alkyl acrylates and methacrylates, such as butyl, 2-ethylhexyl, isooctyl, lauryl, isodecyl, stearyl or oleyl acrylates and methacrylates (lauryl methacrylate especially proves to be in particular advantageous);

C4-C30 alkyl and preferably C6-C22 alkyl α,β-unsaturated amides, in particular alkylacrylamides and -methacrylamides, such as methyl-, ethyl-, butyl-, 2-ethylhexyl-, isooctyl-, lauryl-, isodecyl- or stearylacrylamide or -methacrylamide (laurylmethacrylamide especially proves to be in particular advantageous) and N,N-alkyl(methacrylamides) bishexylacrylamide;

vinyl esters or saturated carboxylic acids, such as vinyl acetate, propionate, versatate or stearate;

the mixtures and combinations of two or more of the abovementioned monomers.

The lauryl methacrylate (LMA) and laurylmethacrylamide (LMAM) monomers are in particular highly suitable as constituent hydrophobic monomers of the associative polymers employed in the context of the present invention.

According to one embodiment, the polymer employed according to the invention comprises at least one of these hydrophobic monomers.

Preferably, the micelles of the micellar solution of step (E) do not contain monomers having a hydrophilic or water-dispersible nature. Moreover, preferably, all the hydrophobic monomers employed in step (E) are contained in micelles of the micellar solution.

The Radical Polymerization Control Agent

The control agent which may advantageously be employed in step (E) or, if appropriate, in step ($E^0$) according to the invention is preferably a compound carrying a thiocarbonylthio —S(C=S)— group. According to a specific embodiment, the control agent may carry several thiocarbonylthio groups. It may optionally be a polymer chain carrying such a group.

Thus, this control agent may, for example, correspond to the formula (A) below:

(A)

in which:

Z represents:
a hydrogen atom,
a chlorine atom,
an optionally substituted alkyl or optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazinyl radical,
an optionally substituted alkoxycarbonyl radical,
an optionally substituted aryloxycarbonyl radical,
an optionally substituted acyloxy or carboxyl radical,
an optionally substituted aroyloxy radical,
an optionally substituted carbamoyl radical,
a cyano radical,
a dialkyl- or diarylphosphonato radical,
a dialkyl-phosphinato or diaryl-phosphinato radical, or
a polymer chain, and $R_1$ represents:
an optionally substituted alkyl, acyl, aryl, aralkyl, alkene or alkyne group,
a saturated or unsaturated, aromatic, optionally substituted carbocycle or heterocycle, or
a polymer chain, which is preferably hydrophilic or water-dispersible when the agent is employed in step (E).

The groups $R_1$ or Z, when they are substituted, may be substituted by optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—$O_2$CR), carbamoyl (—$CONR_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—$NR_2$), halogen, perfluoroalkyl $C_nF_{2n+1}$, allyl, epoxy, alkoxy (—OR), S-alkyl, S-aryl, groups exhibiting a hydrophilic or ionic nature, such as alkaline salts of carboxylic acids, alkaline salts of sulfonic acid, polyalkylene oxide (PEO, PPO) chains, cationic substituents (quaternary ammonium salts), R representing an alkyl or aryl group, or a polymer chain.

For the control agents of formula (A) employed in step (E), it is generally preferred for the group $R_1$ to be of hydrophilic nature. Advantageously, it is a water-soluble or water-dispersible polymer chain.

The group $R_1$ may alternatively be amphiphilic, namely may exhibit both a hydrophilic and lipophilic nature. It is preferable for $R_1$ not to be hydrophobic.

As regards the control agents of formula (A) employed in step ($E^0$), $R_1$ may typically be a substituted or unsubstituted, preferably substituted, alkyl group. A control agent of formula (A) employed in step ($E^0$) may nevertheless comprise other types of groups $R_1$, in particular a cycle or a polymer chain.

The optionally substituted alkyl, acyl, aryl, aralkyl or alkyne groups generally exhibit from 1 to 20 carbon atoms, preferably from 1 to 12 and more preferentially from 1 to 9 carbon atoms. They may be linear or branched. They may also be substituted by oxygen atoms, in particular in the form of esters, sulfur atoms or nitrogen atoms.

Mention may in particular be made, among the alkyl radicals, of the methyl, ethyl, propyl, isopropyl, butyl, tert-butyl, pentyl, hexyl, octyl, decyl or dodecyl radical.

The alkyne groups are radicals generally of 2 to 10 carbon atoms; they exhibit at least one acetylenic unsaturation, such as the acetylenyl radical.

The acyl group is a radical generally exhibiting from 1 to 20 carbon atoms with a carbonyl group.

Mention may in particular be made, among the aryl radicals, of the phenyl radical, which is optionally substituted, in particular by a nitro or hydroxyl functional group.

Mention may in particular be made, among the aralkyl radicals, of the benzyl or phenethyl radical, which is optionally substituted, in particular by a nitro or hydroxyl functional group.

When $R_1$ or Z is a polymer chain, this polymer chain may result from a radical or ionic polymerization or result from a polycondensation.

Advantageously, use is made, as control agent for step (E), and also for step($E^0$), if appropriate, of compounds carrying a xanthate —S(C=S)O—, trithiocarbonate, dithiocarbamate or dithiocarbazate functional group, for example carrying an O-ethyl xanthate functional group of formula —S(C=S)OCH$_2$CH$_3$.

When step ($E^0$) is carried out, it is especially advantageous to employ, as control agents in this step, a compound chosen from xanthates, trithiocarbonates, dithiocarbamates and dithiocarbazates. Xanthates prove to be very particularly advantageous, in particular those carrying an O-ethyl xanthate —S(C=S)OCH$_2$CH$_3$ functional group, such as O-ethyl S-(1-methoxycarbonylethyl) xanthate (CH$_3$CH(CO$_2$CH$_3$))S(C=S)OEt. Another possible control agent in step ($E^0$) is dibenzyl trithiocarbonate of formula PhCH$_2$S(C=S)SCH$_2$Ph (in which Ph=phenyl).

The living prepolymers obtained in step ($E^0$) using the abovementioned control agents prove to be particularly advantageous for carrying out step (E).

Initiation and Performance of the Radical Polymerizations of Steps (E) and ($E^0$)

When it is employed in step (E), the radical polymerization initiator is preferably water-soluble or water-dispersible. Besides this preferential condition, any radical polymerization initiator (source of free radicals) known per se and suited to the conditions chosen for these steps may be employed in step (E) and step)($E^0$) of the process of the invention.

Thus, the radical polymerization initiator employed according to the invention may, for example, be chosen from the initiators conventionally used in radical polymerization. It may, for example, be one of the following initiators:

hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide or benzoyl peroxide, persulfates, such as potassium persulfate, ammonium persulfate or sodium persulfate, azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis (N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis (hydroxymethyl)-2-hydroxyethyl]propionamide), 2,2'-azobis(2-methyl-N-[1,1-bis (hydroxymethyl)ethyl]propionamide), 2,2'-azobis[2-methyl-N-(2-hydroxyethyl) propionamide], 2,2'-azobis(isobutyramide) dihydrate, redox systems comprising combinations, such as:

mixtures of hydrogen peroxide, alkyl peroxide, peresters, percarbonates and the like and of any of the iron salts, titanous salts, zinc formaldehyde sulfoxylate or sodium formaldehyde sulfoxylate, and reducing sugars, and alkali metals or ammonium persulfates, perborates or perchlorates in combination with an alkali metal bisulfite, such as sodium metabisulfite, or sodium formaldehyde sulfoxylate and reducing sugars.

Typically, the amount of initiator to be used is preferably determined so that the amount of radicals generated is at most 50 mol % and preferably at most 20 mol %, with respect to the amount of control or transfer agent.

Very particularly, in step (E), it generally proves to be advantageous to use a radical initiator of redox type, which exhibits, inter alia, the advantage of not requiring heating of the reaction medium (no thermal initiation) and for which the inventors have now additionally discovered that it proves to be suitable for the micellar polymerization of step (E).

Thus, the radical polymerization initiator employed in step (E) may typically be a redox initiator, typically not requiring heating for their thermal initiation. It is typically a mixture of at least one oxidizing agent with at least one reducing agent.

The oxidizing agent present in this redox system is preferably a water-soluble agent. This oxidizing agent may, for example, be chosen from peroxides, such as:

hydrogen peroxide or tert-butyl hydroperoxide;

sodium persulfate, potassium persulfate or ammonium persulfate, or else potassium or sodium bromate.

The reducing agent present in the redox system is also preferably a water-soluble agent. This reducing agent may typically be chosen from sodium formaldehyde sulfoxylate (in particular in its dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations such as:
  mixtures of water-soluble persulfates with water-soluble tertiary amines,
  mixtures of water-soluble bromates (for example, alkali metal bromates) with water-soluble sulfites (for example, alkali metal sulfites),
  mixtures of hydrogen peroxide, alkyl peroxide, peresters, percarbonates and the like and of any of the iron salts, titanous salts, zinc formaldehyde sulfoxylate or sodium formaldehyde sulfoxylate, and reducing sugars,
  alkali metal or ammonium persulfates, perborates or perchlorates in combination with an alkali metal bisulfite, such as sodium metabisulfite, and reducing sugars.

An advantageous redox system comprises (and preferably consists of) the combination of ammonium or sodium or potassium persulfate and of sodium formaldehyde sulfoxylate or of sodium metabisulfite.

Generally, and in particular in the case of the use of a redox system of the persulfate/sodium formaldehyde sulfoxylate type, it proves to be preferable for the reaction medium of step (E) to be devoid of copper. In the case of the presence of copper, it is generally desirable to add a copper-complexing agent, such as EDTA, in an amount suitable for masking its presence. The presence of a complexing agent, such as EDTA, is more generally of use for sequestering undesirable metal cations and it is thus advantageous to use this type of complexing agent when the synthesis medium is likely to contain such metal cations.

Whatever the nature of the initiator employed, the radical polymerization of step)($E^0$) may be carried out in any appropriate physical form, for example in solution in water or in a solvent, for example an alcohol or THF, in emulsion in water ("latex" process) or in bulk, if appropriate while controlling the temperature and/or the pH in order to render entities liquid and/or soluble or insoluble.

On conclusion of step (E), during the specific employment of a control agent, polymers functionalized by transfer groups (living polymers) are obtained. This living nature makes it possible, if desired, to employ these polymers in a subsequent polymerization reaction, according to a technique well known per se. Alternatively, if required, it is possible to deactivate or to destroy the transfer groups, for example by hydrolysis, ozonolysis, oxidation or reaction with amines, according to means known per se. Thus, according to a specific embodiment, the process of the invention may comprise, after step (E), a step (E1) of hydrolysis, of ozonolysis or of reaction with amines suitable for deactivating and/or destroying all or part of the transfer groups present on the polymer prepared in step (E).

Surface-Active Agents which May be Used to Form Micelles in Step (E)

Use may be made, in order to produce the micellar solution of the hydrophobic monomers which are employed in step (E), of any appropriate surfactant (it being understood that such a surface-active agent is not inevitably necessary when self-micellizable monomers are employed). These surface-active agents used to form the micelles in step (E) may constitute a part of the surfactants present in the aqueous formulation of the invention. Thus, a formulation according to the invention may comprise, as a mixture, surface-active agents employed during the implementation of step (E) and additional surfactants. It is also possible to choose, according to a specific embodiment, to remove all or part of the surface-active agents employed in step (E) following the preparation of the polymer, so that all or part of the surfactants employed to form the micelles in step (E) are not present in the formulation according to the invention.

Without limitation, in order to form micelles in step (E), it is possible, for example, to employ surface-active agents chosen from the following list:

anionic surface-active agents which may be chosen from:
  alkyl ester sulfonates, for example of formula R—CH($SO_3M$)-$CH_2$COOR', or alkyl ester sulfates, for example of formula R—CH($OSO_3M$)-$CH_2$COOR', where R represents a $C_8$-$C_{20}$ and preferably $C_{10}$-$C_{16}$ alkyl radical, R' represents a $C_1$-$C_6$ and preferably $C_1$-$C_3$ alkyl radical and M represents an alkaline earth metal cation, for example the sodium cation, or the ammonium cation. Mention may very particularly be made of methyl ester sulfonates, the R radical of which is a $C_{14}$-$C_{16}$ radical; alkylbenzenesulfonates, more particularly $C_9$-$C_{20}$ alkylbenzenesulfonates, primary or secondary alkylsulfonates, in particular $C_8$-$C_{22}$ alkylsulfonates, or alkylglycerolsulfonates;
  alkyl sulfates, for example of formula $ROSO_3M$, where R represents a $C_{10}$-$C_{24}$ and preferably $C_{12}$-$C_{20}$ alkyl or hydroxyalkyl radical and M represents a cation having the same definition as above;
  alkyl ether sulfates, for example of formula RO(OA)$_n$$SO_3M$, where R represents a $C_{10}$-$C_{24}$ and preferably $C_{12}$-$C_{20}$ alkyl or hydroxyalkyl radical, OA represents an ethoxylated and/or propoxylated group, M represents a cation having the same definition as above and n generally varies from 1 to 4, such as, for example, lauryl ether sulfate with n=2;
  alkylamide sulfates, for example of formula RCONHR'$OSO_3M$, where R represents a $C_2$-$C_{22}$ and preferably $C_6$-$C_{20}$ alkyl radical, R' represents a $C_2$-$C_3$ alkyl radical and M represents a cation with the same definition as above, and also their polyalkoxylated (ethoxylated and/or propoxylated) derivatives (alkylamide ether sulfates);
  salts of saturated or unsaturated fatty acids, for example such as $C_8$-$C_{24}$ and preferably $C_{14}$-$C_{20}$ fatty acids, and of an alkaline earth metal cation, N-acyl-N-alkyltaurates, alkylisethionates, alkylsuccinamates and alkyl sulfosuccinates, alkylglutamates, monoesters or diesters of sulfosuccinates, N-acylsarcosinates or polyethoxycarboxylates;
  mono- and diester phosphates, for example having the following formula: (RO)$_x$—P(=O)(OM)$_{x'}$, where R represents an optionally polyalkoxylated alkyl, alkylaryl, arylalkyl or aryl radical, x and x' are equal to 1 or 2, provided that the sum of x and x' is equal to 3, and M represents an alkaline earth metal cation;

nonionic surface-active agents which may be chosen from:
  alkoxylated fatty alcohols, for example laureth-2, laureth-4, laureth-7 or oleth-20, alkoxylated triglycerides, alkoxylated fatty acids, alkoxylated sorbitan esters, alkoxylated fatty amines, alkoxylated di(1-phenylethyl)phenols, alkoxylated tri(1-phenylethyl) phenols, alkoxylated alkylphenols, the products resulting from the condensation of ethylene oxide with a hydrophobic compound resulting from the condensation of propylene oxide with propylene glycol, such as the Pluronic products sold by BASF, the products resulting from the condensation of ethylene oxide the compound resulting from the condensation of propylene oxide with ethylenediamine, such as the Tetronic products sold by BASF, alkylpolyglycosides, such as those described in U.S. Pat. No. 4,565,647, or alkylglucosides, or fatty acid amides, for example $C_8$-$C_{20}$ fatty acid amides, in particular fatty acid monoalkanolamides, for example cocamide MEA or cocamide MIPA;

amphoteric surface-active agents (true amphoteric entities comprising an ionic group and a potentially ionic group of opposite charge, or zwitterionic entities simultaneously comprising two opposite charges) which may be:

betaines generally, in particular carboxybetaines, for example lauryl betaine (Mirataine BB from Rhodia) or octyl betaine or coco betaine (Mirataine BB-FLA from Rhodia); amidoalkyl betaines, such as cocamidopropyl betaine (CAPB) (Mirataine BDJ from Rhodia or Mirataine BET C-30 from Rhodia);

sulfobetaines or sultaines, such as cocamidopropyl hydroxysultaine (Mirataine CBS from Rhodia);

alkylamphoacetates and alkylamphodiacetates, such as, for example, comprising a cocoyl or lauryl chain (Miranol C2M Conc. NP, C32, L32 in particular, from Rhodia); alkylamphopropionates or alkylamphodipropionates (Miranol C2M SF);

alkyl amphohydroxypropyl sultaines (Miranol CS);

alkylamine oxides, for example lauramine oxide (INCI);

compatible mixtures of the abovementioned surfactants.

The surfactants employed according to the present invention may be (alone or in combination with those mentioned above) block copolymers containing at least one hydrophilic block and at least one hydrophobic block different from the hydrophilic block, which are advantageously obtained according to a polymerization process where:

($a_0$) at least one hydrophilic (respectively hydrophobic) monomer, at least one source of free radicals and at least one radical polymerization control agent of the —S(C=S)— type are brought together within an aqueous phase;

($a_1$) the polymer obtained on conclusion of step ($a_0$) is brought into contact with at least one hydrophobic (respectively hydrophilic) monomer different from the monomer employed in step ($a_0$) and at least one source of free radicals; via which a diblock copolymer is obtained.

Polymers of the triblock type, or comprising more blocks, may optionally be obtained by carrying out, after step ($a_1$), a step ($a_2$) in which the polymer obtained on conclusion of step ($a_1$) is brought into contact with at least one monomer different from the monomer employed in step ($a_1$) and at least one source of free radicals; and more generally by carrying out (n+1) steps of the type of the abovementioned steps ($a_1$) and ($a_2$) and n is an integer typically ranging from 1 to 3, where, in each step ($a_n$), with n≥1, the polymer obtained on conclusion of step ($a_{n-1}$) is brought into contact with at least one monomer different from the monomer employed in step ($a_{n-1}$) and at least one source of free radicals. Use may be made, for example, according to the invention, of the copolymers of the type which are described in WO03068827, WO03068848 and WO2005/021612.

Polymers Synthesized According to Step (E)

Under the conditions of step (E), it proves to be possible to control the number-average molar mass of the polymers in a broad range, extending from 1000 g/mol to several million g/mol.

In the context of the present invention, use is preferably made of polymers having a number-average molecular weight Mn of between 500,000 and 12,000,000 g/mol, this weight advantageously being between 1,000,000 g/mol and 10,000,000 g/mol and in particular between 1,500,000 and 5,000,000, for example of the order of 2,000,000 g/mol.

Whatever the size of the polymers synthesized in step (E), these polymers additionally exhibit a highly controlled microstructure, this being the case in particular when a control agent is employed in step (E), with chains which are substantially all similar, comprising hydrophobic blocks distributed substantially in the same way from one polymer chain to another. This homogeneity in the distribution of the hydrophobic blocks from one chain to the other makes it possible to obtain a polymer population all exhibiting similar properties, which makes it possible to provide compositions having perfectly targeted and reproducible properties.

Formulations of the Invention and Use in EOR

In the aqueous formulations of the present invention, which comprise in combination at least one polymer of the abovementioned type, as obtained on conclusion of step (E), and at least one surfactant of the abovementioned type (or more often a mixture of surfactants), the concentration of polymer as obtained according to step (E) is generally between 0.5 and 3 g/l, for example between 1 and 2.5 g/l.

The concentration of surfactants (typically comprising anionic surfactants of abovementioned type, generally including sulfonates) is for its part preferably between 0.5 and 10 g/l, for example between 1 and 5 g/l. It should be noted that, within the meaning of the present description, the notion of "surfactants contained in the formulation" excludes the polymers such as resulting from step (E): although they exhibit an amphiphilic nature, these polymers are not to be regarded as surfactants within the meaning of the present invention.

Furthermore, in an aqueous formulation according to the invention, the polymers/surfactants ratio by weight, calculated by the ratio of the total weight of polymers of the type which are obtained according to step (E) to the total weight of the surfactants, is generally between 0.005 and 2, for example between 0.006 and 0.5.

Furthermore, a formulation according to the invention may be employed under severe conditions of salinity and/or of temperature.

Thus, a formulation according to the invention may be employed under conditions where the combination of the polymers and of the surfactants which it comprises is used in a medium comprising salts up to a total content of dissolved salts (known as TDS for "Total Dissolved Salts") of 150 g/l, for example at a content of greater than or equal to 10 g/l, indeed even of greater than or equal to 20 g/l. In particular at high salinities, and as illustrated in the illustrative examples given below, a polymer as employed according to the invention maintains an acceptable compatibility with the surfactants, where the usual polymers generally tend to be destabilized, often with phase separation. At very high salinities, the formulations according to the invention tend on the contrary to be structured in the form of a gel, which is an advantageous effect which inhibits the phenomena of phase separation (demixing, creaming, and the like) by trapping the entities present in the gel.

Furthermore, a formulation according to the invention may be used over a wide temperature range, extending up to 120° C., indeed even beyond in certain cases. More generally, a composition according to the invention may thus, for example, be employed at a temperature of between 10° C. and 120° C., and in particular above 50° C., indeed even above 70° C., and even above 100° C.

The examples given below illustrate nonlimiting embodiments of the invention and some of their advantages.

EXAMPLES

Example 1

Synthesis of an Associative Polymer P1 of Use According to the Invention

A first polymer P1 (polyAM/AMPS/LMAM/Xa) was prepared under the following conditions:
- 44.0 g of Sodium Dodecyl Sulfate (SDS), 3.12 g of LMAM and 172.88 g of demineralized water were introduced, at ambient temperature (20° C.), into a 500 ml glass bottle. The mixture was left to stir using a magnetic bar in a water bath at 50° C. for 60 min until the LMAM had completely dissolved (Solution A1).
- 595.0 g of Acrylamide in 50% by weight solution in water, 479.7 g of AMPS(Na) in 50% by weight solution in water, 528.74 g of demineralized water and 186.9 g of the Solution A1 prepared above were weighed out in a 2000 ml glass bottle (Solution B1).

After stirring the Solution B1 with the magnetic bar, the pH was measured using a calibrated pH meter; the pH of the solution was 7.2; it was adjusted to 6.0 using a 10% by weight solution of sulfuric acid in water.

5.588 g of a 1% by weight solution of Rhodixan A1 in ethanol were then added.

This new solution was charged to a Dewar flask (3000 ml) equipped with a cap which makes possible an atmospheric airtightness, an anchor stirrer, a temperature probe and a nitrogen inlet, at ambient temperature (20° C.).

The mixture was degassed by bubbling with nitrogen for 60 minutes. 1.8 g of sodium formaldehyde sulfoxylate, in the form of a 5% by weight aqueous solution, and 2.25 g of potassium persulfate (4% by weight aqueous solution) were added to the medium all at once. The mixture was degassed beforehand by bubbling with nitrogen for 15 minutes.

The polymerization reaction was then allowed to take place with stirring for 16 hours, as a result of which the polymer P1 was obtained.

Example 2

Synthesis of an Associative Polymer P2 of Use According to the Invention

A second polymer P2 (polyAM/AMPS/LMAM/Xa) was prepared under the following conditions:
- 45.1 g of Stepanol WA Extra (SDS), 2.21 g of LMAM and 17.62 g of demineralized water were introduced, at ambient temperature (20° C.), into a 2000 ml glass bottle. The mixture was left to stir using a magnetic bar in a water bath at 50° C. for 60 min until the LMAM had completely dissolved (Solution A2).
- 495.8 g of Acrylamide in 50% by weight solution in water, 399.8 g of AMPS in 50% by weight solution in water and 822.3 g of demineralized water were weighed out in this same 2000 ml glass bottle containing the Solution A2 (Solution B2).

After stirring the Solution B2 with the magnetic bar, the pH was measured using a calibrated pH meter; the pH of the solution was 7.9; it was adjusted to 6.0 using a 10% by weight solution of sulfuric acid in water.

4.657 g of a 1% by weight solution of Rhodixan A1 in ethanol were then added. This new solution was charged to a Dewar flask (3000 ml) equipped with a cap which makes possible an atmospheric airtightness, an anchor stirrer, a temperature probe and a nitrogen inlet, at ambient temperature (20° C.).

The mixture was degassed by bubbling with nitrogen for 60 minutes. 8.1 g of 2,2-azobis (2-methylpropionamidine) dihydrochloride (V50), in the form of 10% by weight aqueous solution, 1.8 g of sodium formaldehyde sulfoxylate, in the form of a 10% by weight aqueous solution, and 2.7 g of sodium persulfate (10% by weight aqueous solution) were added to the medium all at once. The mixture was degassed beforehand by bubbling with nitrogen for 15 minutes.

The polymerization reaction was then allowed to take place with stirring for 16 hours, as a result of which the polymer P2 was obtained.

Example 3

Compatibility of the Polymers with Surfactants

The preparation was carried out of aqueous solutions comprising, as a mixture:
- a polymer chosen from the polymer P1 of example 1 or the polymer P2 of example 2 present at a content of 1.5 g/l in the solution;
- surfactants, namely:
   - an alkylbenzenesulfonate ABS (in the form of a sodium salt obtained by neutralization (pH 9) of XOF 25A sold by Huntsman—C15-18 alkyl chain) present at a content of 3 g/l in the solution;
   - an AGES (obtained by propoxylation, then ethoxylation, then sulfonation of the Exxal C13 sold by ExxonMobil—10 propoxy and 6 ethoxy—C13 alcohol chain) present at a content of 5 g/l in the solution;
- salts (namely a mixture of salts comprising, on the basis of the total weight of the salts, 78.2% by weight of NaCl, 1.2% by weight of KCl, 4.2% by weight of $CaCl_2$, 9.4% by weight of $MgCl_2$, 7% by weight of $Na_2SO_4$) present at different concentrations in the solution (TDS).

By way of comparison, the following were produced:
- aqueous solutions identical to the preceding ones but not comprising any polymer at all (known as "CONTROL" solutions); and
- aqueous solutions identical to the preceding ones but containing, instead of a polymer according to the invention, a polymer P3 of the type usually employed in the currently known surfactant polymer flooding techniques (known as "COMPARATIVE" solutions), namely Flopaam 3630S sold by SNF, at the concentration of 2 g/l generally recommended for this type of polymer in surfactant polymer flooding.

For the various solutions, the turbidity of the solution was measured at 50° C. The results are reported in TABLE 1 below, where the turbidity is given on a scale from 0 (=completely transparent solution) to 1 (=completely opaque solution), the limiting value of 0.4 corresponding to the threshold value beyond which the turbidity is regarded as unacceptable.

TABLE 1 reveals a clear improvement in the compatibility between the surfactants and the polymers P1 and P2, this being the case over the entire range of salinity evaluated, in particular at the highest salinities, where it should be noted that the polymer of the solutions of the COMPARATIVE test leads to demixing, whereas the formulations incorporating the polymers P1 and P2 maintain an acceptable compatibility. It is interesting to note that, for high salinities (i.e., respectively greater than 16 g/l and 12 g/l for P1 and for P2), the formulation is structured in the form of a gel, which is reflected by the presence of bubbles created by shearing of the free interface during homogenization of the formulations by stirring, which do not cream and remain trapped in situ.

The static adsorption values, expressed in milligrams of surfactants adsorbed per gram of rock (mg/g), are as follows, which reflects that the polymer of the invention maintains

TABLE 1 turbidities measured at 50° C. for the solutions tested

| Polymer present | Content of salts (TDS in g/l) | | | | | | | | | | | | | | |
|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 |
| P1 | 0.13 | 0.07 | 0.05 | 0.09 | 0.13 | 0.13 | 0.15 | 0.17 | 0.19 | 0.24 | 0.29 | 0.35 | 0.41 | 0.44 | 0.47 |
| P2 | 0.09 | 0.12 | 0.10 | 0.13 | 0.12 | 0.11 | 0.15 | 0.19 | 0.22 | 0.30 | 0.43 | 0.52 | 0.67 | 0.71 | 0.78 |
| P3 COMPARATIVE | 0.24 | 0.23 | 0.37 | 0.54 | 0.66 | 0.71 | 0.69 | 0.70 | 0.72 | 0.74 | 0.74 | 0.80 | 0 | (*) | (*) |
| None (CONTROL) | 0.01 | 0.01 | 0.05 | 0.12 | 0.20 | 0.23 | 0.25 | 0.29 | 0.30 | 0.33 | 0.40 | 0.54 | 0.77 | 0.78 | 0.81 |

(***): completely demixed formulation

Example 4

Viscosity of the Polymer/Surfactant Mixtures

The viscosity of each of the solutions of example 3 containing 10 g/l of dissolved salts (TDS) was measured at 50° C. for different shear rates under the following conditions: in Couette geometry (rheometer LS300—proRheo—geometry MB1/MK1), a logarithmic shear rate gradient from 100 s$^{-1}$ to 1 s$^{-1}$ was produced. The shear stress is measured and the viscosity is deduced by calculating the ratio of the stress to the shear rate.

The values are reported in TABLE 2 below, which reflects the flow curve of the solutions, and from where it emerges that the solutions based on the polymers P1 and P2 develop a greater viscosity than that based on the polymer of the comparative test, even at lower contents (1.5 g/l versus 2 g/l for the COMPARATIVE), which reflects another specific advantage of the polymers of the invention, at least from an economic viewpoint, insofar as they make possible an improvement in the sweeping efficiency at lower polymer contents.

the advantages observed with the usual polymers, in addition to obtaining the abovementioned advantages:
Polymer P1—500 ppm: 5 mg/g
Polymer P2—500 ppm: 4.8 mg/g
COMPARATIVE: Polymer P3—500 ppm: 5 mg/g
CONTROL—no polymer: 7 mg/g

The invention claimed is:
1. An aqueous formulation suitable as extraction fluid in enhanced oil recovery, which comprises:
   (i) a mixture of surfactants comprising:
       at least one first anionic sulfonate surfactant; and
       at least one second anionic surfactant selected from the group consisting of alkyl ether sulfates AES, alkyl glyceryl ether sulfonates AGES, alkyl ether carboxylates, a styryl phenol alkoxylate sulfate, a styryl phenol alkoxylate phosphate and their mixtures; and
   (ii) at least one polymer as obtained according to a step (E) of micellar radical polymerization in which the following are brought into contact, within an aqueous medium (M):

TABLE 2 viscosity (in cP) for different shear rate values (50° C.)

| Polymer present | Shear rate (s$^{-1}$) | | | | | | | | | | |
|---|---|---|---|---|---|---|---|---|---|---|---|
| | 1 | 1.18 | 1.93 | 3.16 | 5.18 | 8.48 | 13.90 | 22.76 | 32.28 | 61.05 | 100 |
| P1 | 359.2 | 338.1 | 266.8 | 248.0 | 228.8 | 222.4 | 220.3 | 204.3 | 183.3 | 175.6 | 133.1 |
| P2 | 1351 | 1236 | 877.0 | 688.0 | 468.5 | 425.7 | 375.8 | 227.7 | 183.2 | 175.1 | 144.1 |
| P3 (COMPARATIVE) | 29.45 | 25.52 | 24.58 | 19.47 | 17.29 | 15.63 | 14.10 | 12.28 | 11.11 | 9.61 | 8.54 |

Example 5

Decrease in the Retention of the Surfactants

The tendency which surfactants have to be adsorbed on a rock was compared with the polymers of the invention and with other polymers or in the absence of polymers.

To do this, the static adsorption at ambient temperature of surfactants on a rock composed of 93% sandstone and 7% clay was measured for solutions of the type which are described in example 3, containing 10 g/l of dissolved salts (TDS), according to the protocol described in the paper SPE-174603. The solutions tested are those of example 3, with the only difference that they comprise a different amount of polymers, namely 500 ppm (apart from the CONTROL, which does not comprise any).

hydrophilic monomers, dissolved or dispersed in said aqueous medium (M);
hydrophobic monomers in the form of a micellar solution, said micellar solution containing, in the dispersed state within the medium (M), micelles comprising said hydrophobic monomers; and
at least one radical polymerization control agent;
wherein the mixture of surfactants is between 0.5 and 10 g/L and the polymer is between 0.5 to 3 g/L in the aqueous formulation.

2. The aqueous formulation as claimed in claim 1, wherein the hydrophilic monomers are selected from the group consisting of:
   carboxylic acids which are ethylenically unsaturated, sulfonic acids and phosphonic acids, or their derivates;

esters of α,β-ethylenically unsaturated mono- and dicarboxylic acids with C2-C3 alkanediols;
amides of α,β-ethylenically unsaturated monocarboxylic acids and their N-alkyl and N,N-dialkyl derivatives;
N-vinyllactams;
sulfobetaines; and
the mixtures and combinations of two or more of the above mentioned monomers.

3. The aqueous formulation as claimed in claim 2, wherein
the carboxylic acids which are ethylenically unsaturated, sulfonic acids and phosphonic acids, and/or their derivatives are selected from the group consisting of acrylic acid, methacrylic acid, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid, α-methylvinylphosphonic acid and allylphosphonic acid, and their salts;
the esters of α,β-ethylenically unsaturated mono- and dicarboxylic acids with C2-C3 alkanediols are selected from the group consisting of 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol (meth)acrylates;
the amides of α,β-ethylenically unsaturated monocarboxylic acids and their N-alkyl and N,N-dialkyl derivatives are selected from the group consisting of acrylamide, methacrylamide, N-methyl(meth)acrylamide, N,N-dimethyl(meth)acrylamide, morpholinyl(meth)acrylamide, and metholylacrylamide;
the N-vinyllactams are selected from the group consisting of N-vinylpyrrolidone and N-vinylpiperidone.

4. The aqueous formulation as claimed in claim 2, wherein the hydrophilic monomers comprise (meth)acrylamide monomers.

5. The aqueous formulation as claimed in claim 4, wherein the (meth)acrylamide monomers comprise acrylamide, AMPS, or combinations thereof.

6. The aqueous formulation as claimed in claim 1, wherein the hydrophobic monomers are selected from the group consisting of:
vinylaromatic monomers;
halogenated vinyl compounds;
esters of α,β-ethylenically unsaturated mono- or dicarboxylic acid with C4-C30 alkanols;
esters of vinyl or allyl alcohol with C1-C30 monocarboxylic acids;
esters of α,β-ethylenically unsaturated mono- or dicarboxylic acid with a C4-C30 alkanediol;
primary amides of α,β-ethylenically unsaturated mono- and dicarboxylic acids and N-(C4-C30)alkyl and N,N-di(C3-C30)alkyl derivatives;
C2-C8 monoolefins and nonaromatic hydrocarbons comprising at least one double bond.

7. The aqueous formulation as claimed in claim 6, wherein the hydrophobic monomers comprise lauryl (meth)acrylate LMA or lauryl(meth)acrylamide LMAM monomers.

8. The aqueous formulation as claimed in claim 6, wherein
the vinylaromatic monomers are selected from the group consisting of styrene, α-methylstyrene, para-chloromethylstyrene, vinyltoluene, 2-methylstyrene, 4-methylstyrene, 2-(n-butyl) styrene, tert-butyl styrene or 4-(n-decyl) styrene;
the halogenated vinyl compounds-are selected from the group consisting of vinyl or vinylidene halides;
the C2-C8 monoolefins and nonaromatic hydrocarbons comprising at least one double bond are selected from the group consisting of ethylene, propylene, isobutylene, isoprene and butadiene.

9. The aqueous formulation as claimed in claim 1, wherein the polymer is prepared according to the step (E) carried out in the presence of a control agent.

10. The aqueous formulation as claimed in claim 9, wherein the control agent carries a xanthate—S(C=S)O— functional group.

11. A process for enhanced oil recovery from an underground formation, in which:
an aqueous formulation as claimed in claim 1 is injected into said underground formation, by at least one injection well; and
a fluid conveying the oil leaving the underground formation is recovered via at least one production well.

12. The process as claimed in claim 11, wherein:
the formulation is employed under conditions where the combination of the polymers and of the surfactants which it comprises is used in a medium comprising salts at a content of greater than or equal to 10 g/l;
the formulation is employed at a temperature of greater than 50° C.; or
combinations thereof.

13. The process as claimed in claim 12, wherein the medium comprises salts at a content of between 10 g/l and 150 g/l.

14. The process as claimed in claim 12, wherein the formulation is employed at a temperature of between 70° C. and 120° C.

15. The aqueous formulation as claimed in claim 1, wherein the anionic surfactant of sulfonate type is an internal olefin sulfonate; an alkylarylsulfonate; a sulfonate and/or disulfonate of α-sulfocarbonyl compounds; or a sulfosuccinate or sulfosuccinamate.

16. The aqueous formulation as claimed in claim 15, wherein the alkylarylsulfonate is an alkylbenzenesulfonate ABS.

* * * * *